Feb. 17, 1953     K. J. SHOMBER     2,628,384
CLOSURE MEMBER OR FURNITURE GLIDE
Filed March 18, 1950
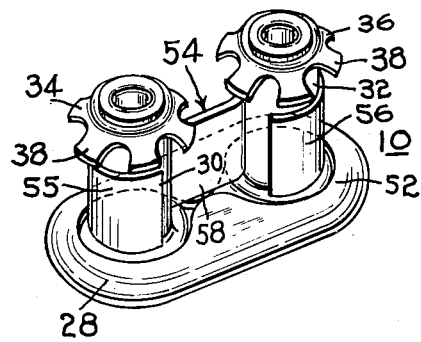
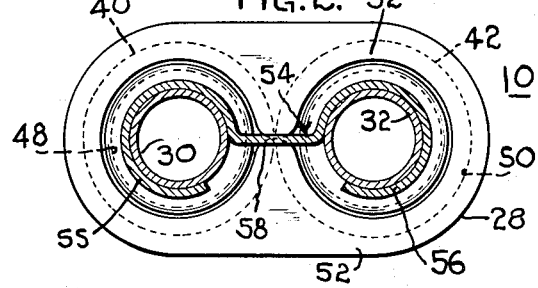
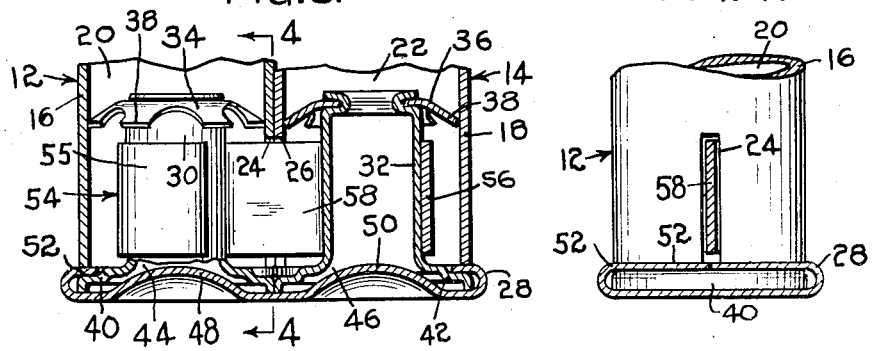
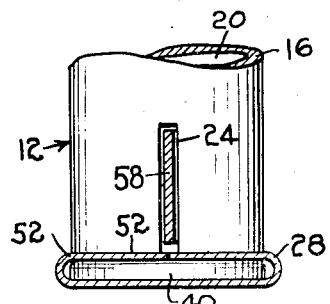
INVENTOR:
KERIAN J. SHOMBER,
BY Philip E. Parker
ATTORNEY.

Patented Feb. 17, 1953

2,628,384

UNITED STATES PATENT OFFICE 2,628,384

CLOSURE MEMBER OR FURNITURE GLIDE

Kerian J. Shomber, Oakland, Calif., assignor to United-Carr Fastener Corporation, Cambridge, Mass., a corporation of Massachusetts Application March 18, 1950, Serial No. 150,407

4 Claims. (Cl. 16—42)

This invention relates generally to closure members, and has particular reference to closure members used for insertion into the ends of tubular members such as metal furniture legs.

The object of the invention is to provide a closure member which is adapted to be inserted into the ends of a pair of adjacent tubular members to retain the members in fixed relation to one another.

A further object of the invention is to provide a closure member for assembly in the ends of a pair of adjacent tubular members which is provided with means for entering opposing apertures in the ends of the walls of the tubular members to prevent orbital movement of the tubular members relative to each other.

Other objects of the invention will, in part, be obvious, and will, in part, appear hereinafter. For a fuller understanding of the nature and objects of the invention, reference should be had to the following detailed description, taken in conjunction with the accompanying drawing, in which:

Fig. 1 is a perspective view of a closure member embodying the features of the invention;

Fig. 2 is a top plan view of the closure member of Fig. 1;

Fig. 3 is a view in elevation, partly in section, of the closure member of Fig. 1 assembled in a pair of adjacent tubular members; and Fig. 4 is a view in section taken on line 4—4 of Fig. 3.

Referring to the drawing, there is illustrated a closure member 10, which is adapted for assembly into the ends of a pair of adjacent tubular members 12 and 14, to retain them in fixed relation to one another. The tubular members 12 and 14 may form the leg of an article of furniture (not shown), in which case the closure member 10 also serves as a glide for supporting said article. The tubular members 12 and 14 comprise generally cylindrical metal walls 16 and 18 forming internal bores 20 and 22, and are provided with opposing apertures or slots 24 and 26 which open to the ends thereof.

In the preferred embodiment, the closure member 10 comprises a base 28, having a pair of upwardly extending support column members 30 and 32 for entering the bores of the tubes, and tube-engaging members 34 and 36 mounted on the upper ends thereof. The tube-engaging members 34 and 36 may comprise flexible plates with serrated edges forming teeth 38, and are slightly larger in diameter than the diameter of the tubes so that when the closure member is assembled, the teeth 38 flex downwardly and bite into the internal surface of the walls 16 and 18 of the tubes.

The support column members are provided with flanges 40 and 42 on the lower ends thereof, which extend outwardly and downwardly forming cavities 44 and 46 in the bottoms of the column members. The base 28 is provided with a pair of upwardly rounded embossments 48 and 50, which are spaced apart so that the support columns 30 and 32 may be disposed thereon with the embossments 48 and 50 entering the cavities 44 and 46. The base 28 is also provided with a peripheral portion 52 which is turned inwardly to cover a portion of the flanges 40 and 42 to retain the column members in assembly with the base.

To provide means for entering the slots 24 and 26 in the walls of the tubes, to prevent orbital movement of the tubes relative to each other, a rigid strap member 54 is assembled on the column members, and comprises a pair of end portions 55 and 56 which encircle the column members to retain the strap in assembly therewith, and a medial portion 58 which extends directly between the column members substantially on a line connecting the centers thereof.

To assemble the closure member with the tubes 12 and 14, the support columns 30 and 32 are inserted into the ends of the tubes, causing the teeth 38 to frictionally engage the internal surface of the walls 16 and 18. The support columns are forced into the tubes until the base 28 bears against the ends of the tubes, and the closure member is retained in the position by the tube-engaging members 34 and 36. During the insertion, the medial portion 58 of the strap enters the opposing slots 24 and 26, thereby retaining the tubes in rigid non-rotatable relation to one another.

Since certain obvious modifications may be made in the device without departing from the scope of the invention, it is intended that all matter contained herein be interpreted in an illustrative and not in a limting sense.

I claim:

1. A closure member for assembly into the ends of a pair of adjacent tubular members, said closure member comprising a pair of spaced support column members for insertion into the ends of the tubes, said support column members having means thereon for internal engagement with the tubes, a supporting base on adjacent ends of the column members, and rigid strap means extending between the support column members for entering longitudinal slots in the ends of the walls of the tubes, said strap means being disposed intermediate the tube-engaging means and the base.

2. A closure member for assembly into the ends of a pair of adjacent tubular members, said closure member comprising a pair of spaced support column members for insertion into the ends of the tubes, said support column members each having means thereon at one end for internal engagement with the tubes, a supporting base at the other end thereof, and a rigid strap member assembled on the columns, said strap member having end portions encircling the columns, and a medial portion extending therebetween on a line connecting the centers of the column members for entering slots in the ends of the walls of the tubes, whereby orbital movement of the tubes relative to one another is prevented.

3. A closure member for assembly into the ends of a pair of adjacent tubular members, said closure member comprising a base, a pair of spaced support column members secured to the base and adapted for entering the ends of the tubes, means on the suport column members for internal engagement with the tubes, and a rigid strap member assembled on the support column members between tube-engaging means and the base, said strap member having ends encircling the support column members and a medial portion extending therebetween on a line connecting the centers of the column members for entering slots in the ends of the walls of the tubes when the closure member is assembled.

4. A closure member for assembly into the ends of a pair of adjacent tubular members, said closure member comprising a base, said base having a pair of upwardly extending spaced embossed portions disposed therein, a pair of spaced support column members disposed on the base for entering the ends of the tubes, means on one end of the support column members for internal engagement with the tubes, and flanges on the other ends extending outwardly and downwardly therefrom to form a recess in the lower end of each column, said embossment on the base being disposed in the recess, the base having an outer periphery portion curled inwardly over the said flanges, and a rigid strap member connecting the column members, said strap member having ends encircling the support columns and a medial portion extending therebetween on a line connecting the centers of the column members for entering opposing slots in the ends of the walls of the tubes when the closure member is assembled.

KERIAN J. SHOMBER.

REFERENCES CITED

The following references are of record in the file of this patent:

UNITED STATES PATENTS

| Number | Name | Date |
|---|---|---|
| D. 126,593 | Rohde | Apr. 15, 1941 |
| 1,789,974 | Grant | Jan. 27, 1931 |
| 1,844,077 | Silverman | Feb. 9, 1932 |
| 1,995,260 | Flint | Mar. 19, 1935 |
| 2,485,784 | Shoenberg | Oct. 25, 1949 |
| 2,546,492 | Booth | Mar. 27, 1951 |